US012069449B2

(12) United States Patent
Jang et al.

(10) Patent No.: US 12,069,449 B2
(45) Date of Patent: Aug. 20, 2024

(54) METHOD FOR PROCESSING AUDIO SIGNAL AND ELECTRONIC DEVICE SUPPORTING THE SAME

(71) Applicant: Samsung Electronics Co., Ltd., Suwon-si (KR)

(72) Inventors: Byeongyeop Jang, Suwon-si (KR); Mira Seo, Suwon-si (KR); Sangheon Kim, Suwon-si (KR); Kwangyong Choi, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 17/881,066

(22) Filed: Aug. 4, 2022

(65) Prior Publication Data

US 2023/0049288 A1 Feb. 16, 2023

Related U.S. Application Data

(63) Continuation of application No. PCT/KR2022/011574, filed on Aug. 4, 2022.

(30) Foreign Application Priority Data

Aug. 4, 2021 (KR) ........................ 10-2021-0102430

(51) Int. Cl.
*H04R 3/02* (2006.01)
*G10L 21/0232* (2013.01)
(Continued)

(52) U.S. Cl.
CPC ............ *H04R 3/02* (2013.01); *G10L 21/0232* (2013.01); *H04R 29/001* (2013.01); *G10L 2021/02082* (2013.01)

(58) Field of Classification Search
CPC ..... H04R 3/02; H04R 29/001; G10L 21/0232; G10L 2021/02082
See application file for complete search history.

(56) References Cited

U.S. PATENT DOCUMENTS 9,412,353 B2 8/2016 Rhee
9,680,999 B2 6/2017 Jang
(Continued)

FOREIGN PATENT DOCUMENTS

JP 2001-298394 A 10/2001
JP 2010-062774 A 3/2010
(Continued)

OTHER PUBLICATIONS

International Search Report dated Nov. 16, 2022, issued in International Application No. PCT/KR2022/011574.

*Primary Examiner* — David L Ton
(74) *Attorney, Agent, or Firm* — Jefferson IP Law, LLP

(57) ABSTRACT

An electronic device is provided. The electronic device includes a speaker, a microphone, a processor, and a memory. For example, the electronic device may obtain a first audio signal during a first specified time by using the microphone, may identify reference noise intensity based on the first audio signal, may obtain a second audio signal exceeding the reference noise intensity by using the microphone, may turn off the microphone based on a fact that a third audio signal having the reference noise intensity or less is obtained during a second specified time or longer, and may modulate and output the second audio signal through the speaker while the microphone is turned off.

15 Claims, 14 Drawing Sheets

(51) Int. Cl.

| | |
|---|---|
| ***H04R 29/00*** | (2006.01) |
| *G10L 21/0208* | (2013.01) |

(56) References Cited

U.S. PATENT DOCUMENTS

| | | | | |
|---|---|---|---|---|
| 10,223,445 | B2 | 3/2019 | Suleman et al. | |
| 10,431,221 | B2 | 10/2019 | Yoon | |
| 11,217,234 | B2 | 1/2022 | Jeong et al. | |
| 11,290,814 | B1 * | 3/2022 | Hook | H04R 29/005 |
| 11,675,983 | B2 | 6/2023 | Liu et al. | |
| 2012/0221329 | A1 * | 8/2012 | Harsch | H04R 3/02 704/E21.002 |
| 2015/0081279 | A1 | 3/2015 | Suleman et al. | |
| 2020/0389729 | A1 | 12/2020 | Graham et al. | |
| 2021/0173725 | A1 | 6/2021 | Kontothanasis et al. | |
| 2021/0196139 | A1 | 7/2021 | Botzer | |
| 2021/0286934 | A1 | 9/2021 | Liu et al. | |
| 2022/0369031 | A1 * | 11/2022 | Lester | G10K 11/1752 |

FOREIGN PATENT DOCUMENTS

| | | | |
|---|---|---|---|
| KR | 10-1990-0002303 | A | 2/1990 |
| KR | 10-2002-0041220 | A | 6/2002 |
| KR | 10-2014-0009725 | A | 1/2014 |
| KR | 10-2014-0145401 | A | 12/2014 |
| KR | 10-2018-0135595 | A | 12/2018 |
| KR | 10-2019-0106938 | A | 9/2019 |
| KR | 10-2109608 | B1 | 5/2020 |

* cited by examiner

METHOD FOR PROCESSING AUDIO SIGNAL AND ELECTRONIC DEVICE SUPPORTING THE SAME

CROSS-REFERENCE TO RELATED APPLICATION(S)

This application is a continuation application, claiming priority under § 365(c), of an International application No. PCT/KR2022/011574, filed on Aug. 4, 2022, which is based on and claims the benefit of a Korean patent application number 10-2021-0102430, filed on Aug. 4, 2021, in the Korean Intellectual Property Office, the disclosure of which is incorporated by reference herein in its entirety.

TECHNICAL FIELD

The disclosure relates to an audio signal processing method and an electronic device supporting the same.

BACKGROUND ART

An electronic device may provide various functions to a user by using a signal obtained through an input device (e.g., a microphone). For example, the electronic device may obtain an audio signal by using a microphone, may apply various effects (e.g., modulation) to the obtained audio signal, and may output the processed result.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device may output an audio signal, which is obtained from the outside, to the outside by using an output device. For example, the electronic device may output the audio signal to the outside by using a speaker. An echo phenomenon that the audio signal output through the speaker is entered again into a microphone may occur in the electronic device.

When the echo phenomenon continues, it may be difficult for the electronic device to output the audio signal intended by a user. Moreover, due to a roaring sound generated through the echo phenomenon, it may be difficult for an electronic device to provide immediate voice feedback.

Aspect of the disclosure are to address at least the above-mentioned problems and/or disadvantages and to provide at least the advantages described below. Accordingly, an aspect of the disclosure is to provide an electronic device that identifies reference noise intensity based on a specified algorithm and then performs a processing operation on the audio signal based on the identified reference noise intensity.

Another aspect of the disclosure is to provide an audio signal processing method capable of preventing an echo phenomenon and providing an immediate voice feedback function, and an electronic device supporting the same.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a speaker, a microphone, a processor, and a memory operatively connected to the speaker, the microphone, and the processor and configured to store instructions. For example, the instructions may, when executed by the processor, cause the electronic device to obtain a first audio signal during a first specified time by using the microphone, to identify reference noise intensity based on the first audio signal, to obtain a second audio signal exceeding the reference noise intensity by using the microphone, to turn off the microphone based on a fact that a third audio signal having the reference noise intensity or less is obtained during a second specified time or longer, and to modulate and output the second audio signal through the speaker while the microphone is turned off.

In accordance with another aspect of the disclosure, a method in which an electronic device processes an audio signal is provided. The method includes obtaining a first audio signal during a first specified time by using a microphone, identifying reference noise intensity based on the first audio signal, obtaining a second audio signal exceeding the reference noise intensity by using the microphone, turning off the microphone based on a fact that a third audio signal having the reference noise intensity or less is obtained during a second specified time or longer, and while the microphone is turned off, modulating and outputting the second audio signal through a speaker.

Advantageous Effects

According to embodiments disclosed in the specification, an echo phenomenon may be prevented by identifying reference noise intensity based on various algorithms and processing an audio signal based on the identification result.

According to embodiments disclosed in the specification, even when a user does not separately enter an input, an efficient user experience may be provided by immediately determining whether to perform a post-processing operation based on a specified condition.

According to embodiments disclosed in the specification, the quality of an audio function provided to a user may be improved by performing an optimized audio signal processing operation based on characteristics (e.g., signal strength, frequency band, and/or reception time) of the audio signal obtained through an input device.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
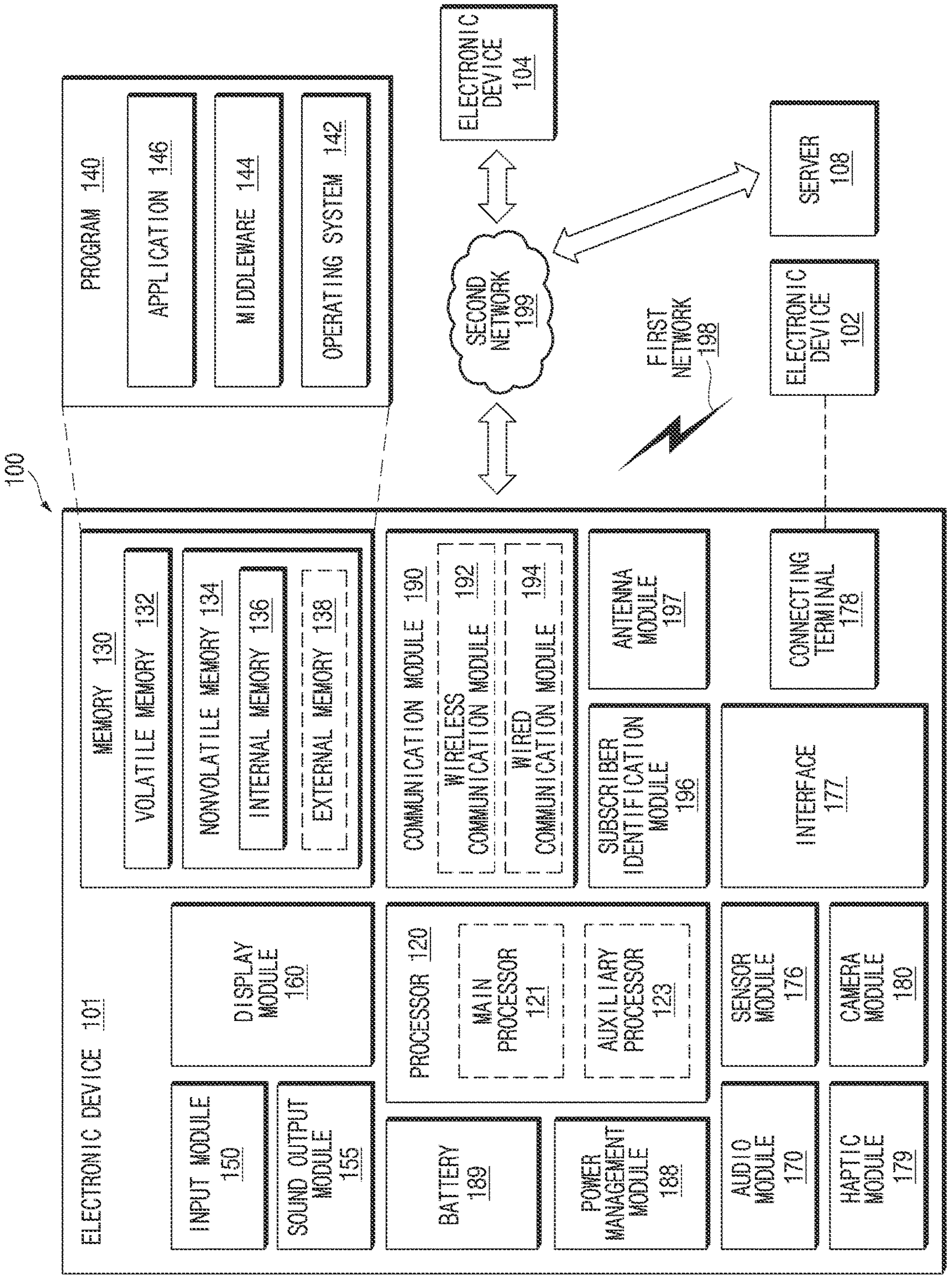
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™, or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
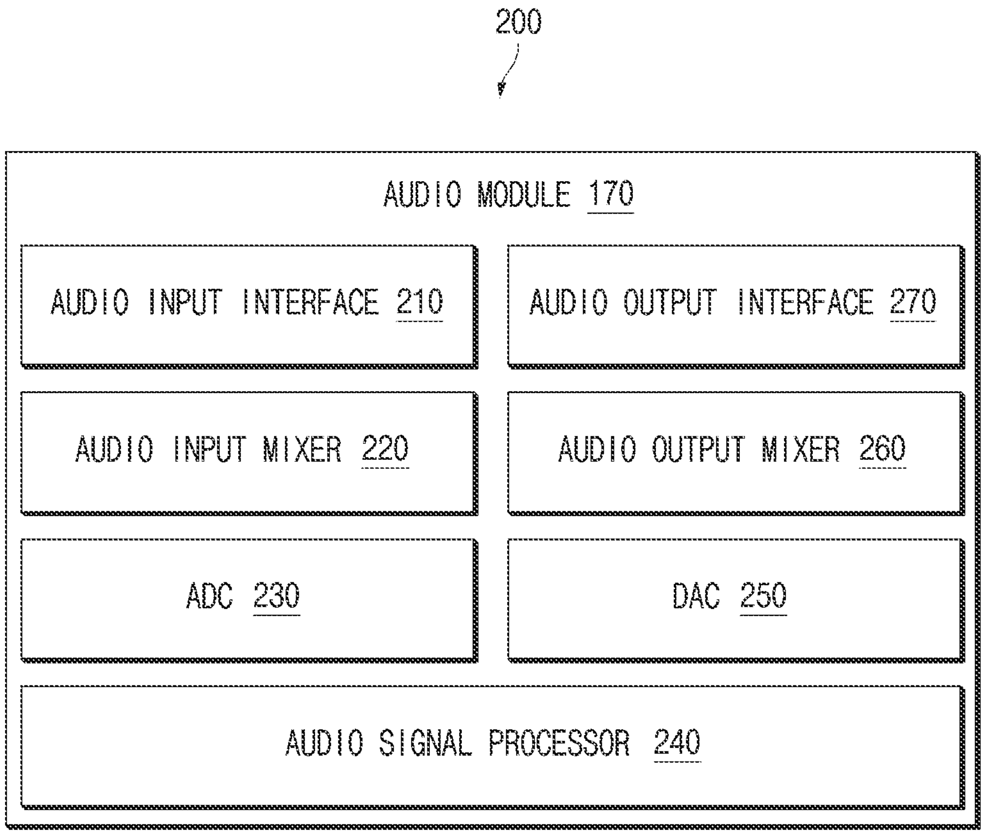
FIG. 2 is a block diagram illustrating an audio module according to an embodiment of the disclosure.

FIG. 2 is a block diagram illustrating the audio module according to an embodiment of the disclosure.

Referring to FIG. 2, in a system 200, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor 120 or the memory 130) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

Figure 3:
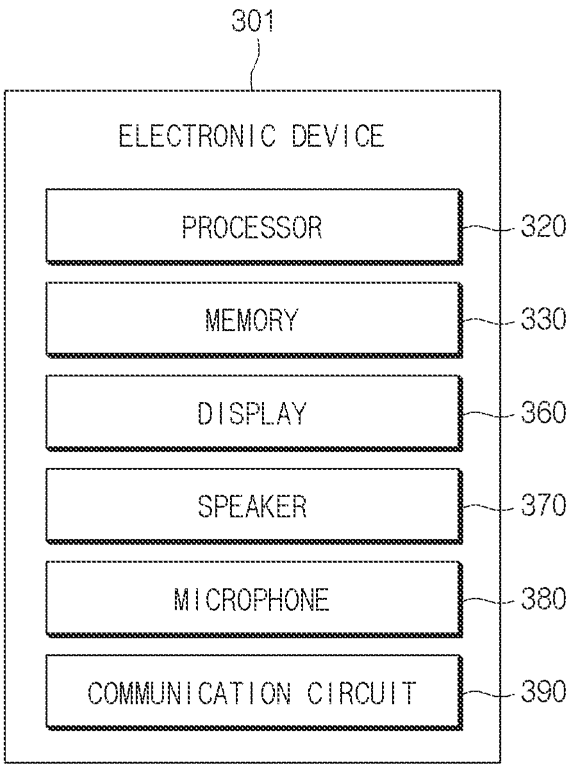
FIG. 3 is a block diagram illustrating a configuration of an electronic device according to an embodiment.

FIG. 3 is a block diagram illustrating a configuration of an electronic device, according to an embodiment of the disclosure.

Referring to FIG. 3, according to an embodiment, an electronic device 301 may include a processor 320 (e.g., the processor 120 of FIG. 1), a memory 330 (e.g., the memory 130 of FIG. 1), a display 360 (e.g., the display module 160 of FIG. 1), a speaker 370 (e.g., the sound output module 155 of FIG. 1 or the audio module 170 of FIGS. 1 and 2), a microphone 380 (e.g., the input module 150 of FIG. 1 or the audio module 170 of FIGS. 1 and 2), and/or a communication circuit 390 (e.g., the communication module 190 of FIG. 1). For example, the electronic device 301 may perform all or part of operations performed by the electronic device 101 of FIG. 1 described above. Components of the electronic device 301 illustrated in FIG. 3 is an example, and embodiments of the disclosure are not limited thereto. For example, the electronic device 301 may include at least part of the components of the electronic device (e.g., the electronic device 101 of FIG. 1) described above with reference to FIG. 1, or may not include at least part of the components shown in FIG. 3.

In an embodiment, the memory 330 may store information associated with various functions provided by the electronic device 301. For example, the memory 330 may store at least one audio level (e.g., an audio level corresponding to a specified frequency band) identified based on a user utterance input obtained by using the microphone 380.

In an embodiment, the processor 320 may obtain a first audio signal.

In an embodiment, the processor 320 may obtain the first audio signal based on a first user input. In an embodiment, the processor 320 may obtain the first audio signal in response to the first user input. In an embodiment, when the first user input is detected, the processor 320 may obtain the first audio signal through the microphone 380. In an embodiment, when the first user input is detected, the processor 320 may turn on the microphone 380 and then may obtain the first audio signal. In an embodiment, the first user input may be detected through a user interface (UI). In an embodiment, the user interface may include an execution screen of an application (e.g., a voice modulation application). In an embodiment, the first user input may be a touch input to a noise recording button included in the execution screen of an application.

In an embodiment, the processor 320 may obtain the first audio signal during a first specified time. In an embodiment, the first specified time may be 1 second.

In an embodiment, the processor 320 may identify reference noise intensity.

In an embodiment, the processor 320 may identify the reference noise intensity based on the first audio signal. In an embodiment, the processor 320 may identify the reference noise intensity based on a root mean square (RMS) value of the first audio signal. In an embodiment, the processor 320 may identify the reference noise intensity based on the RMS value of the first audio signal and a specified weight. In an embodiment, the specified weight may be identified based on the first audio signal and at least one audio level.

In an embodiment, the processor 320 may obtain the first audio signal during the first specified time by using the microphone 380. For example, the first audio signal may be referred to as an audio signal that includes noise occurring at a periphery of the user and does not include a user utterance input. For example, the processor 320 may turn off the microphone 380 after the first specified time has elapsed.

In an embodiment, the processor 320 may identify the reference noise intensity based on the first audio signal. In an embodiment, the processor 320 may identify the reference noise intensity based on a root mean square (RMS) value of the first audio signal. In an embodiment, the processor 320 may identify the reference noise intensity based on the RMS value of the first audio signal and the specified weight. In an embodiment, the specified weight may be identified based on the first audio signal and at least one audio level.

In an embodiment, at least one audio level may be obtained based on a user utterance input. For example, the processor 320 may obtain a user utterance input by using the microphone 380 and may identify an audio level based on the obtained user utterance input. For example, the processor 320 may identify an audio level of a signal corresponding to a specified frequency band in the user utterance input. As another example, the processor 320 may identify an audio level of a signal according to a specified frequency band in the user utterance input. For example, the specified frequency band may be referred to as a frequency band of a user's voice. For example, the specified frequency band may include a band of 500 to 8000 Hz.

In an embodiment, the processor 320 may identify whether an audio signal satisfies a specified condition. For example, the processor 320 may identify whether an RMS value, the first audio signal, and/or a characteristic of at least one audio level satisfies the specified condition. In an embodiment, when it is identified that the RMS value, the first audio signal, and/or the characteristic of at least one audio level satisfies the specified condition, the processor 320 may identify the reference noise intensity. An operation of determining whether the specified condition is satisfied will be described in detail with reference to FIGS. 5 and 6.

According to an embodiment, the processor 320 may determine an audio signal to be modulated, based on the reference noise intensity.

In an embodiment, when a second user input is detected, the processor 320 may turn on the microphone 380 and then may obtain an audio signal. For example, the processor 320 may detect a second user input to at least part of an execution screen of a specified application (e.g., a voice modulation application) displayed on the display 360. For example, the second user input may be a touch input to a voice recording button included in the execution screen of the application.

In an embodiment, the processor 320 may obtain the second audio signal. For example, the signal intensity of the second audio signal may exceed the reference noise intensity. For example, when an audio signal exceeding the reference noise intensity is obtained, the processor 320 may determine the obtained audio signal as an audio signal to be modulated.

In an embodiment, the processor 320 may obtain the second audio signal and then may obtain the third audio signal. For example, the signal intensity of the third audio signal may not be greater than the reference noise intensity. For example, when an audio signal having the reference noise intensity or less is obtained during the second specified time or longer, the processor 320 may determine that the user utterance input has terminated. For example, the second specified time may be 1 second. For example, when the third audio signal is obtained during the second specified time or longer, the processor 320 may determine that the user utterance input has terminated, and then may turn off the microphone 380. For example, the third audio signal may be referred to as an audio signal that does not include a user utterance input. The processor 320 may turn off the microphone 380 and may determine the second audio signal as an audio signal to be modulated.

According to another embodiment, the processor 320 may determine an audio signal to be modulated, based on the characteristic of the obtained audio signal. The characteristic of the audio signal may include information included in the audio signal, a frequency band of the audio signal, the intensity of the audio signal, or a combination thereof.

In an embodiment, the processor 320 may obtain a fourth audio signal including a user utterance input and then may turn off the microphone 380 based on a fact that the third audio signal having the reference noise intensity or less is obtained during a second specified time or longer. For example, when the third audio signal having the reference noise intensity or less is obtained during the second specified time or longer, the processor 320 may determine that the user utterance input has terminated. For example, the processor 320 may determine whether a signal of a frequency band corresponding to the user utterance input is included in the fourth audio signal. When it is identified that the fourth audio signal includes a signal of the frequency band corresponding to a user utterance input, the processor 320 may determine that the fourth audio signal is an audio signal to be modulated, regardless of exceeding the reference noise intensity.

In an embodiment, the processor 320 may modulate the audio signal and may output the modulated audio signal through the speaker 370. For example, the processor 320 may turn off the microphone 380 and may output the modulated audio signal through the speaker 370. For example, the processor 320 may modulate the second audio signal and may output the modulated second audio signal through the speaker 370. For example, the processor 320 may modulate the fourth audio signal and may output the modulated fourth audio signal through the speaker 370.

In an embodiment, the processor 320 may transmit the modulated audio signal to an external device (e.g., a Bluetooth speaker) through the communication circuit 390. For example, the processor 320 may control an external device so as to transmit the modulated audio signal to an external device without being output and then to output the modulated audio signal. For example, while the modulated audio signal is output from the external device, the processor 320 may continuously turn off the microphone 380.

In an embodiment, when the output of the modulated audio signal is terminated, the processor 320 may turn on the microphone 380. For example, the processor 320 may output a modulated audio signal. When the output of the modulated audio signal is terminated, the processor 320 may turn on the microphone 380 and may obtain various audio signals. For example, the processor 320 may repeatedly determine whether a signal obtained by using the microphone 380 exceeds previously-identified reference noise intensity.

In the above-described embodiment, it is described that the processor 320 turns off the microphone 380 being a hardware component when the specified condition is satisfied. However, embodiments of the disclosure are not limited thereto.

In an embodiment, the processor 320 may control an operation of the microphone 380 through software (e.g., the program 140 of FIG. 1). For example, the processor 320 may transmit, to the software (e.g., the program 140 of FIG. 1), a control signal that allows the microphone 380 not to obtain an audio signal thus generated from the outside. In other words, the processor 320 does not directly turn off the microphone 380 that is a hardware configuration, but may indirectly control the microphone 380 not to operate by executing software.

In an embodiment, the processor 320 may perform the embodiments of the disclosure without turning off the microphone 380. For example, when the microphone 380 receives an audio signal while being turned on, the processor 320 may not process at least part of the received audio signal. In other words, when the microphone 380 receives an audio signal while being turned on, the processor 320 may control the speaker 370 so as not to output at least part of the received audio signal and may control the speaker 370 so as to output only the modulated audio signal.

Figure 4:
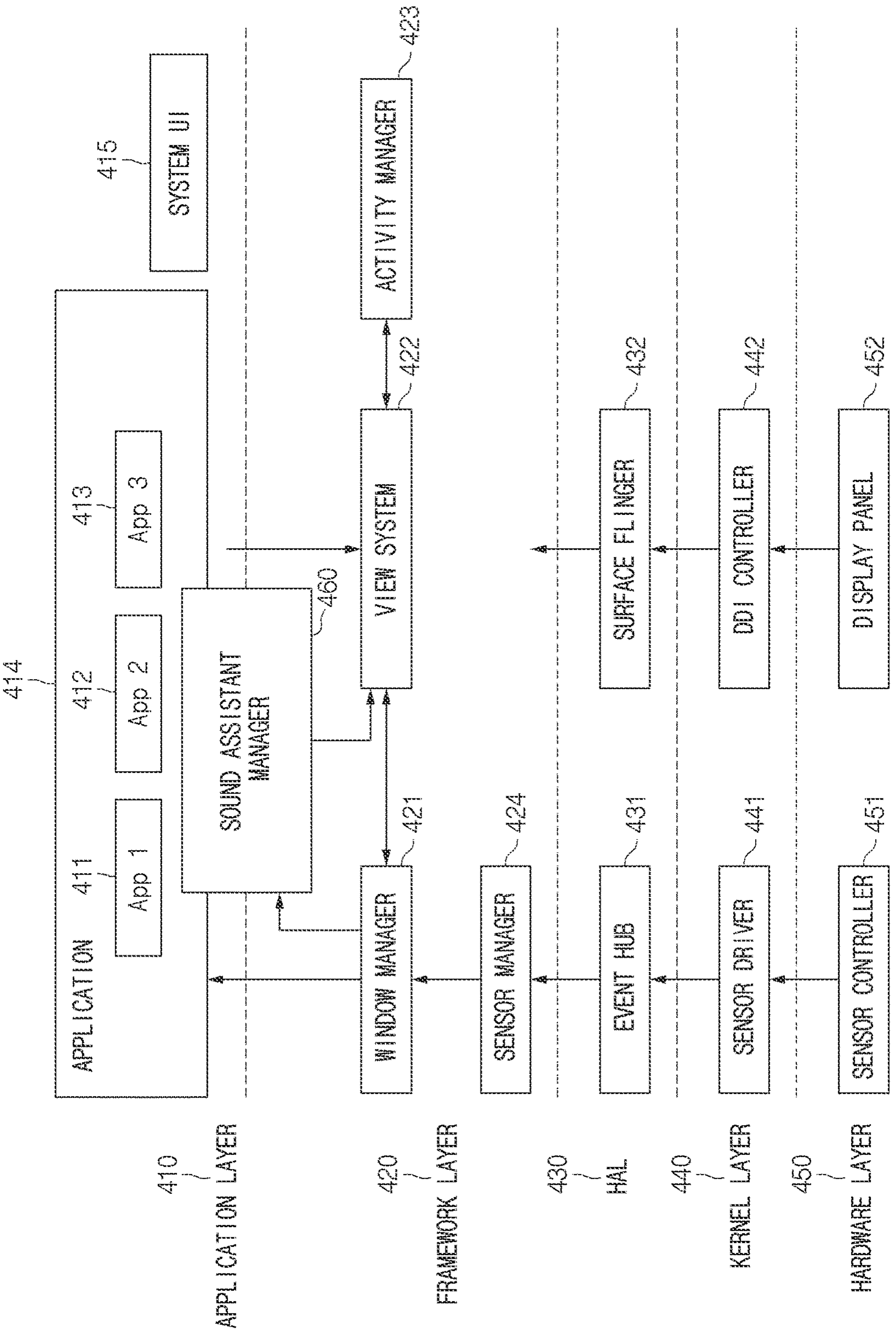
FIG. 4 is a block diagram illustrating a software structure of an electronic device, according to an embodiment of the disclosure.

FIG. 4 is a block diagram illustrating a software structure of an electronic device, according to an embodiment of the disclosure.

Referring to FIG. 4, according to an embodiment, a processor (e.g., the processor 120 of FIG. 1) may load a program (e.g., the program 140 of FIG. 1) including an application layer 410, a framework layer 420, a hardware abstraction layer (HAL) 430, a kernel layer 440, and/or a hardware layer 450 on to a memory (e.g., the memory 130 of FIG. 1) and then may execute the program. The plurality of layers illustrated in FIG. 4 may be layers illustrated while at least part of the program loaded onto the memory is divided functionally or logically.

According to an embodiment, the application layer 410 may be stored in the memory (e.g., the memory 130 of FIG. 1) and may include at least one application 414 (e.g., App1 411, App2 412, and App3 413) (e.g., the application 146 of FIG. 1) and a system user interface (UI) 415, which are capable of being executed by a processor (e.g., the processor 120 of FIG. 1).

In an embodiment, the application 414 may include an audio application for performing functions (e.g., an audio signal modulation function, an audio playback function, an audio volume control function, and/or an audio signal recording function) related to audio signal processing. For example, an audio application may be referred to as an application configured to modulate an audio signal related to a user utterance input into various voices and then to output the various voices to the outside. For example, the audio application may output a user interface, which allows a user to control a function related to the processing of an audio signal, to an execution screen.

In an embodiment, the system UI 415 may be referred to as an application constituting at least one graphical user interface (GUI) screen implemented in a system of an electronic device (e.g., the electronic device 101 of FIG. 1). In an embodiment, the system UI 415 may include a notification bar or a quick view.

According to an embodiment, the framework layer 420 may provide various functions to the application 411 such that the function or information provided from one or more resources included in the electronic device is capable of being used by the application 411.

In an embodiment, the framework layer 420 may include a window manager 421, a view system 422, an activity manager 423, a sensor manager 424, and a sound assistant manager 460.

For example, the window manager 421 may manage one or more GUI resources displayed on a display (e.g., the display module 160 of FIG. 1) of the electronic device.

For example, the view system 422 may be a set of extensible views used to generate a user interface. The user interface may mean various interfaces included in the execution screen of the application 414.

For example, the activity manager 423 may control the life cycle or activity stack of an application.

For example, the sensor manager 424 may control the operation of a sensor based on the usability of the application 414 using the sensor (e.g., the sensor module 176 of FIG. 1).

For example, the sound assistant manager 460 may control operations performed by an audio application. The sound assistant manager 460 may manage and control an audio signal modulation function, an audio signal modulation function, an audio playback function, an audio volume adjusting function, an audio signal recording function, and/or an execution screen of an audio application.

According to an embodiment, the HAL 430 may manage an abstracted layer between a framework and hardware (e.g., the speaker 370 and/or the microphone 380 of FIG. 3) included in the electronic device. For example, the HAL 430 may include an event hub 431 and a surface flinger 432.

For example, the event hub 431 may provide an interface for standardizing an event occurring in a touch module and/or a sensor module.

For example, the surface flinger 432 may perform a function of providing an execution screen, which is to be displayed on the display, from among execution screens generated by the application 414. As another example, when the configuration of a display is changed, the surface flinger 432 may request the application 414 to change resolution and density depending on the changed configuration. The event hub 431 may be an interface module standardizing an event occurring in a touch module, a sensor module (the sensor module 176 of FIG. 1), and the like.

According to an embodiment, the kernel layer 440 may include various drivers or controllers for controlling hardware devices included in the electronic device. For example, the kernel layer 440 may include a sensor driver 441 and a display driver integrated circuit (DDI) controller 442.

For example, the sensor driver 441 may include an interface module for controlling the sensor controller 451 connected to a sensor. As another example, the sensor driver 441 may receive a control signal transmitted by the event hub 431 included in the HAL 430 and may control the sensor based on the control signal.

For example, the DDI controller 442 may include an interface module that controls a DDI included in the display. As another example, the DDI controller 442 may receive a control signal transmitted by the surface flinger 432 included in the HAL 430 and then may control a display based on the control signal. The DDI controller 442 may be physically connected to various types of interface (e.g., MIPI-display serial interface (DSI), HDMI, and/or embedded display port (eDP)) panels 452. The DDI controller 442 may package an image of the frame buffer so as to be suitable for a protocol of the interface and may transmit the packaged result to the display panel 452.

According to an embodiment, the hardware layer 450 may include a sensor controller 451 and a display panel 452.

For example, the sensor controller 451 may include a hall sensor for sensing motion information of an electronic device.

For example, the display panel 452 may receive a control signal transmitted by the DDI controller 442 and may output various screens based on the control signal.

Figure 5:
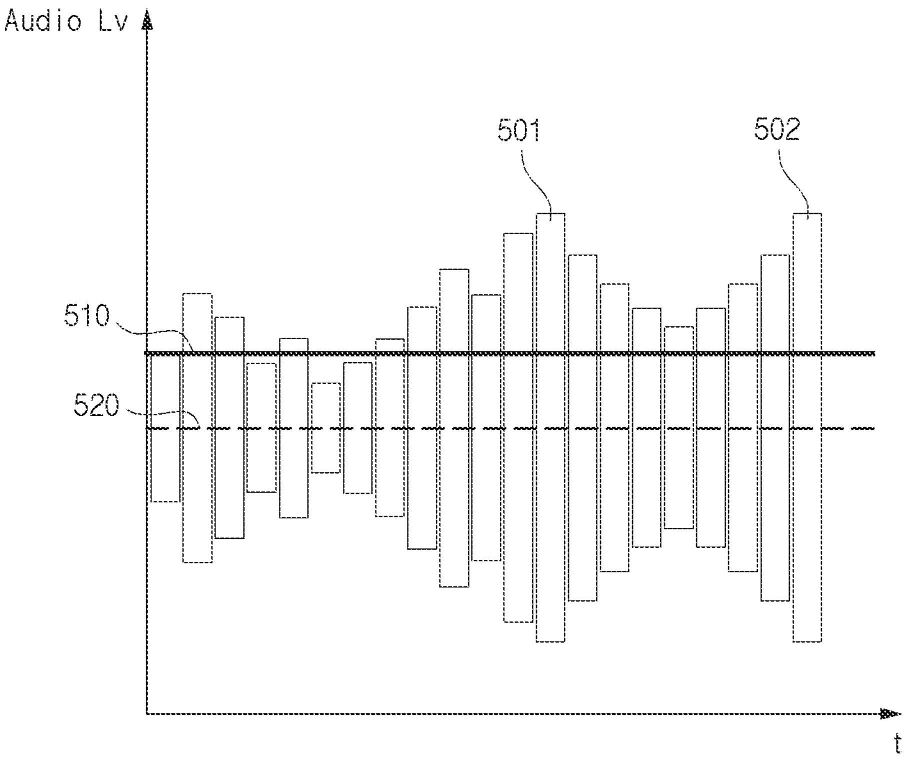
FIG. 5 is a diagram illustrating an intensity of an audio signal obtained by an electronic device, according to an embodiment of the disclosure.

FIG. 5 is a diagram illustrating the intensity of an audio signal obtained by an electronic device, according to an embodiment of the disclosure.

Referring to FIG. 5, according to an embodiment, a table shown in FIG. 5 may be referred to as a table indicating audio levels of audio signals obtained over time. For example, an x-axis of a table may be referred to as time (t), and a y-axis of the table may be referred to as audio level (audio 1*v*) (or, audio signal intensity).

In an embodiment, an electronic device (e.g., the electronic device 301 of FIG. 3) may obtain an audio signal by using a microphone (e.g., the microphone 380 of FIG. 3). For example, the electronic device may identify reference noise intensity by using the obtained audio signal.

In an embodiment, the electronic device may identify the reference noise intensity based on Equation 1.

$$\text{Reference noise intensity} = RMS\ \text{value} \cdot \left(1.5 + \sum_{i=1}^{n} \frac{Ei - Pi}{n}\right) \quad \text{Equation 1}$$

In an embodiment, an RMS value may be an RMS value 510 calculated based on a first audio signal. In an embodiment, $E_i$ may be an audio level calculated based on a user utterance input. In an embodiment, $P_i$ may be an audio level calculated based on the first audio signal. In an embodiment, n may be the sampling number of obtained audio signals.

In an embodiment, the electronic device may obtain a user utterance input by using a microphone and then may identify at least one audio level $E_i$ corresponding to a specified frequency band based on the obtained user utterance input. For example, the specified frequency band may be 500 to 8000 Hz. An example of an audio level corresponding to the specified frequency band may be as shown in Table 1.

TABLE 1

| Frequency band (Hz) | Audio level (dB) |
|---|---|
| 500 | −25 |
| 1000 | −30 |
| 1500 | −50 |

TABLE 1-continued

| Frequency band (Hz) | Audio level (dB) |
|---|---|
| 2000 | −55 |
| 8000 | −100 |

In an embodiment, the electronic device may obtain the first audio signal during the first specified time by using a microphone. For example, the electronic device may calculate the RMS value 510 or at least one audio level based on the first audio signal.

For example, the electronic device may identify or calculate the RMS value 510 based on the obtained first audio signal. For example, the RMS value may be referred to as an average value of an audio level of the first audio signal. For example, the electronic device may convert the first audio signal based on a pulse code modulation (PCM) method. The electronic device may identify a value, which is obtained by squaring sampled data values, adding all of the squared data values to generate a total data value, and dividing the total data value by the total number of samples, as the RMS value 510.

For example, the electronic device may identify or calculate at least one audio level based on the obtained first audio signal. For example, the specified frequency band may be 500 to 8000 Hz. An example of an audio level corresponding to the specified frequency band may be as shown in Table 2.

TABLE 2

| Frequency band (Hz) | Audio level (dB) |
|---|---|
| 500 | −70 |
| 1000 | −50 |
| 1500 | −40 |
| 2000 | −40 |
| 8000 | −50 |

In an embodiment, when the audio signal satisfies a specified criterion, the electronic device may identify the reference noise intensity. For example, when the RMS value 510 is not greater than a specified value, the electronic device may identify the reference noise intensity.

For example, the electronic device may identify a reference value 520. The reference value 520 may be referred to as the average intensity of ambient noise. The reference value 520 may be 40 to 60 dB. However, this is an example, and embodiments of the disclosure are not limited thereto. For example, the electronic device may identify the reference value 520 determined by a user's setting. As another example, the electronic device may identify the reference value 520 preset in the specified application.

For example, the electronic device may compare the RMS value 510 with the reference value 520. For example, when a difference between the RMS value 510 and the reference value 520 is within a first value calculated based on the reference value 520, the electronic device may identify the reference noise intensity by using the RMS value 510, at least one audio level calculated based on the first audio signal, and at least one audio level calculated based on a user utterance input.

For example, the first value may be referred to as a value corresponding to 0.7 times the reference value 520. However, this is an example, and embodiments of the disclosure are not limited thereto.

In an embodiment, when the first specified time satisfies a specified criterion, the electronic device may identify the reference noise intensity. For example, when a time during which a signal corresponding to a value less than a specified value is obtained during the first specified time is not greater than the specified time, the electronic device may identify the reference noise intensity.

For example, when a time during which a signal corresponding to a value less than a second value calculated based on the RMS value 510 is obtained during the first specified time is not greater than the specified time, the electronic device may identify the reference noise intensity by using the RMS value 510, at least one audio level calculated based on the first audio signal, and at least one audio level calculated based on a user utterance input.

For example, the second value may be referred to as a value corresponding to 1.3 times the RMS value 510. However, this is an example, and embodiments of the disclosure are not limited thereto.

For example, an audio level according to reference numbers 501 and 502 may be referred to as an audio level exceeding a second value. The electronic device may identify audio levels according to reference numbers 501 and 502 as peak levels.

Figure 6:
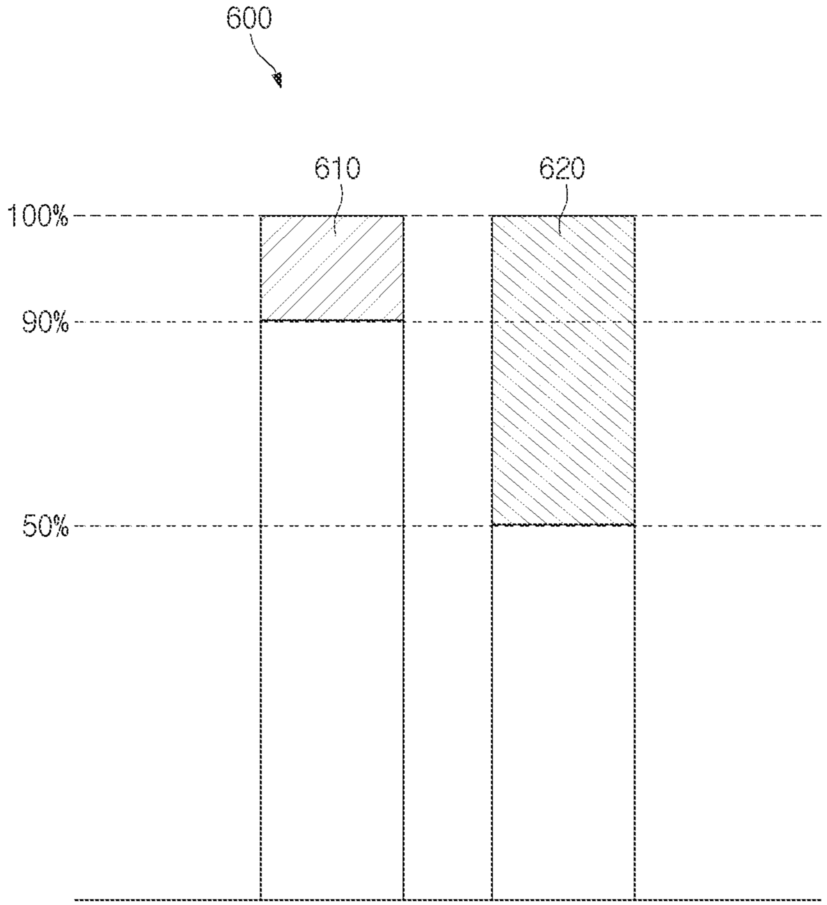
FIG. 6 is a diagram illustrating a reference for measuring reference noise intensity, according to an embodiment of the disclosure.

FIG. 6 is a diagram illustrating a reference for measuring reference noise intensity, according to an embodiment of the disclosure.

Referring to FIG. 6, according to an embodiment, in a graph 600, the reference number 610 may correspond to a case where a time, during which a signal corresponding to a value less than a second value calculated based on an RMS value (e.g., the RMS value 510 of FIG. 5) is obtained during a first specified time during which a first audio signal is obtained, is not greater than 10%.

In an embodiment, for reference number 610, an electronic device (e.g., the electronic device 101 of FIG. 1) may determine that the obtained first audio signal is an appropriate audio signal for identification of reference noise intensity. For example, the electronic device may calculate at least one audio level calculated based on the RMS value and the first audio signal by using the first audio signal and then may identify the reference noise intensity.

According to an embodiment, the reference number 620 may correspond to a case where a time, during which a signal corresponding to a value less than a second value calculated based on an RMS value is obtained during a first specified time during which a first audio signal is obtained, is greater than 30%.

In an embodiment, for reference number 620, an electronic device may determine that the obtained first audio signal is an inappropriate audio signal for identification of reference noise intensity. For example, the electronic device may display, on a display (e.g., the display module 160 of FIG. 1), information about a fact that an audio signal needs to be obtained again for identification of the reference noise intensity.

Figure 7:
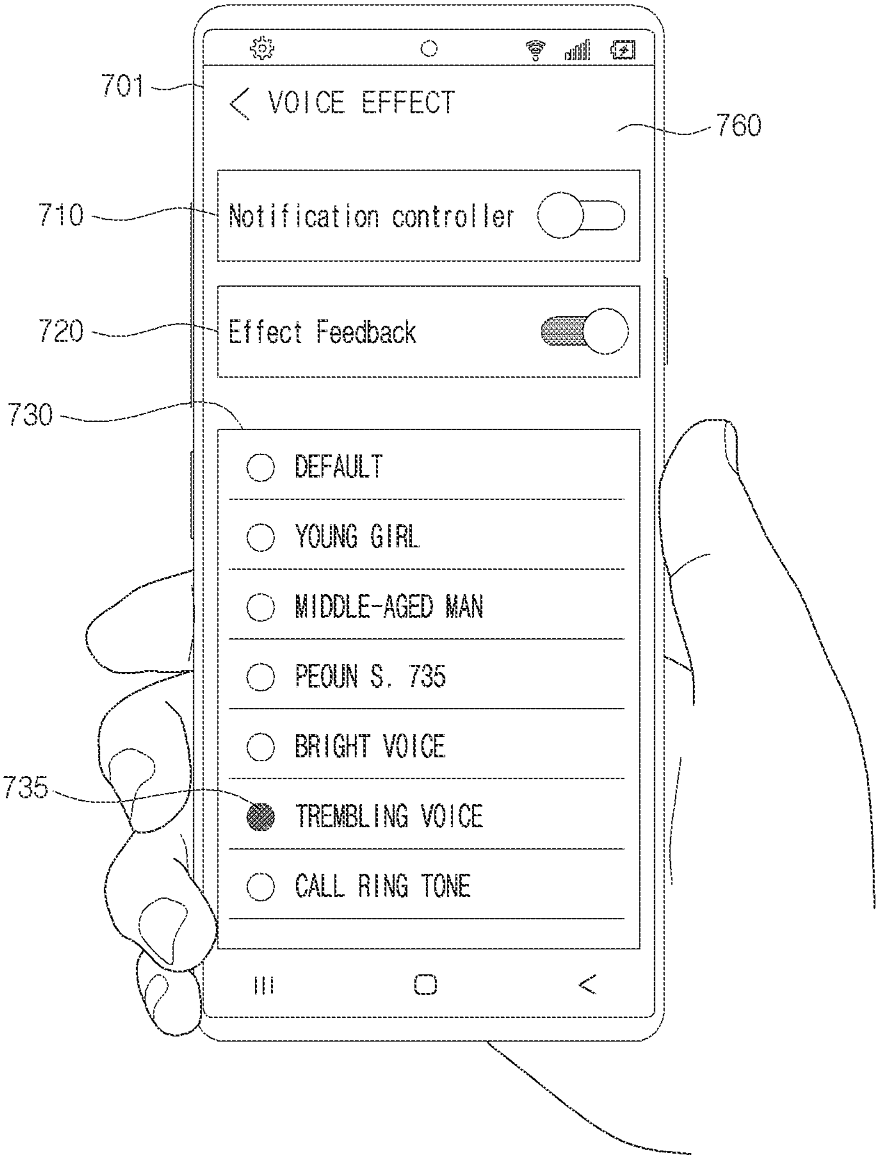
FIG. 7 illustrates a user interface of an electronic device, according to an embodiment of the disclosure.

FIG. 7 illustrates a user interface of an electronic device, according to an embodiment of the disclosure.

Referring to FIG. 7, according to an embodiment, an electronic device 701 (e.g., the electronic device 101 of FIG. 1) may display various user interfaces on a display 760 (e.g., the display module 160 in FIG. 1). For example, the electronic device 701 may display various user interfaces included in an execution screen of an application providing an audio signal modulation function on the display 760.

In an embodiment, the electronic device 701 may display a first user interface 710, which provides a notification control function, on the display 760. For example, when a user input (e.g., a touch input) to an area of the first user interface 710 is detected, the electronic device 701 may turn on and/or off a notification function according to a modulation function of an audio signal. For example, when the notification function is turned on, the electronic device 701 may display information corresponding to various events (e.g., microphone off, audio signal modulation, or modulation signal output) occurring in a process of performing an audio signal modulation function on the display 760.

In an embodiment, the electronic device 701 may display a second user interface 720, which provides an effect feedback function, on the display 760. For example, when a user input to an area of the second user interface 720 is detected, the electronic device 701 may turn on and/or off a function of outputting a modulated audio signal through a speaker (e.g., the speaker 370 of FIG. 3). For example, when the effect feedback function is in an on state, the electronic device 701 may automatically output the modulated audio signal through the speaker. For example, while the electronic device 701 outputs the modulated audio signal, the electronic device 701 may turn off the microphone (e.g., the microphone 380 of FIG. 3).

In an embodiment, the electronic device 701 may display a third user interface 730 that provides a function of changing audio signal modulation into various forms on the display 760. For example, the third user interface 730 may include a voice list (e.g., default, young girl, middle-aged man, bright voice, trembling voice, or call ring tone). For example, when a user input to one area 735 of a "trembling voice" tab in the voice list is detected, the electronic device 701 may determine that the audio signal is modulated to "trembling voice".

Figure 8:
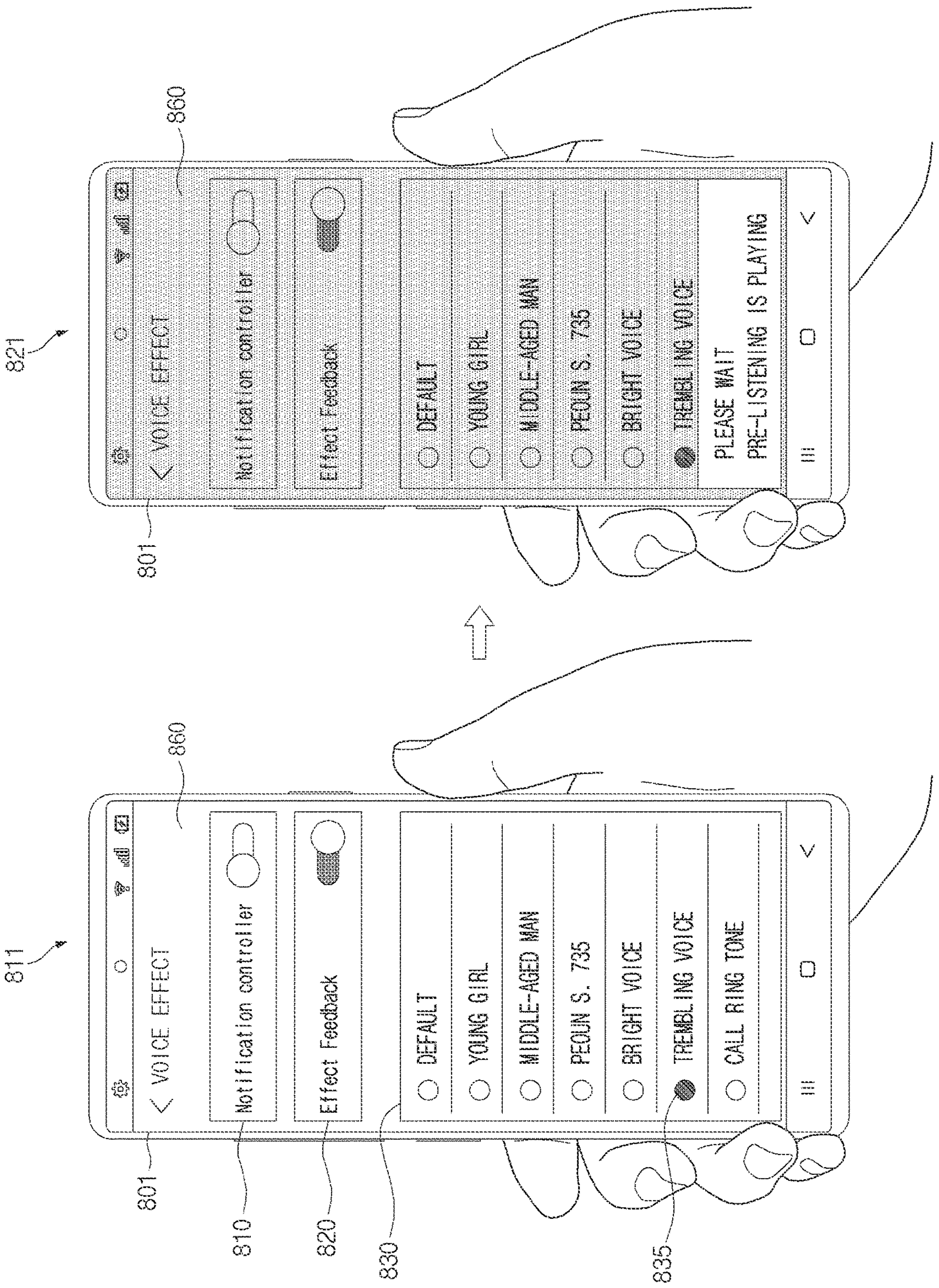
FIG. 8 illustrates a user interface of an electronic device, according to an embodiment of the disclosure.

FIG. 8 illustrates a user interface of an electronic device, according to an embodiment of the disclosure.

Referring to FIG. 8, according to an embodiment, referring to reference panel 811, an electronic device 801 (e.g., the electronic device 101 of FIG. 1) may display an execution screen of an application performing an audio signal modulation function on a display 860 (e.g., the display module 160 of FIG. 1). For example, the execution screen of the application may include a first user interface 810, a second user interface 820, and a third user interface 830. The description of user interfaces may be replaced with the description of user interfaces having the same name of FIG. 7 described above.

In an embodiment, the electronic device 801 may detect a user input to the second user interface 820. For example, the electronic device 801 may turn on an effect feedback function in response to a user input to the second user interface 820.

In an embodiment, the electronic device 801 may detect a user input to a "trembling voice" tab 835 of the third user interface 830. For example, the electronic device 801 may detect a user input, may determine an audio signal to be modulated, and may modulate the determined audio signal based on "trembling voice".

According to an embodiment, referring to reference panel 821, the electronic device 801 may output a modulated audio signal through a speaker (e.g., the speaker 370 of FIG. 3). For example, the electronic device 801 may determine an audio signal to be modulated, based on the reference noise intensity or the characteristic of the obtained audio signal and then may modulate and output the determined audio signal. For example, while outputting the modulated audio signal, the electronic device 801 may display, on the display 860, a user interface including information indicating that a microphone (e.g., the microphone 380 of FIG. 3) is in an off state.

In an embodiment, the electronic device 801 may modulate an audio signal based on whether the reference noise intensity is exceeded. For example, the electronic device 801 may identify reference noise intensity based on the first audio signal and may obtain a second audio signal exceeding the reference noise intensity by using a microphone. The electronic device 801 may turn off the microphone based on a fact that a third audio signal having the reference noise intensity or less is obtained during a second specified time or longer. While the microphone is turned off, the electronic device 801 may modulate and output the second audio signal through the speaker. The operation of identifying reference noise may be replaced with the description of FIGS. 5 to 6 described above.

In an embodiment, the electronic device 801 may modulate an audio signal based on the characteristic of the audio signal. For example, when it is determined that the fourth audio signal includes an audio signal corresponding to the frequency band of the user's voice, the electronic device 801 may omit whether the reference noise intensity is exceeded, and then may determine the fourth audio signal as an audio signal to be modulated. For example, the electronic device 801 may obtain the fourth audio signal including a user utterance input, may turn off the microphone based on a fact that the third audio signal is obtained during a second specified time or longer, and may modulate and output the fourth audio signal through the speaker while microphone is turned off.

According to an embodiment, when the output of the modulated audio signal is finished, the electronic device 801 may turn on the microphone. For example, when the output of the modulated audio signal is finished, the electronic device 801 may turn on the microphone and may display, on the display 860, a user interface including information indicating that the microphone is turned on.

Figure 9:
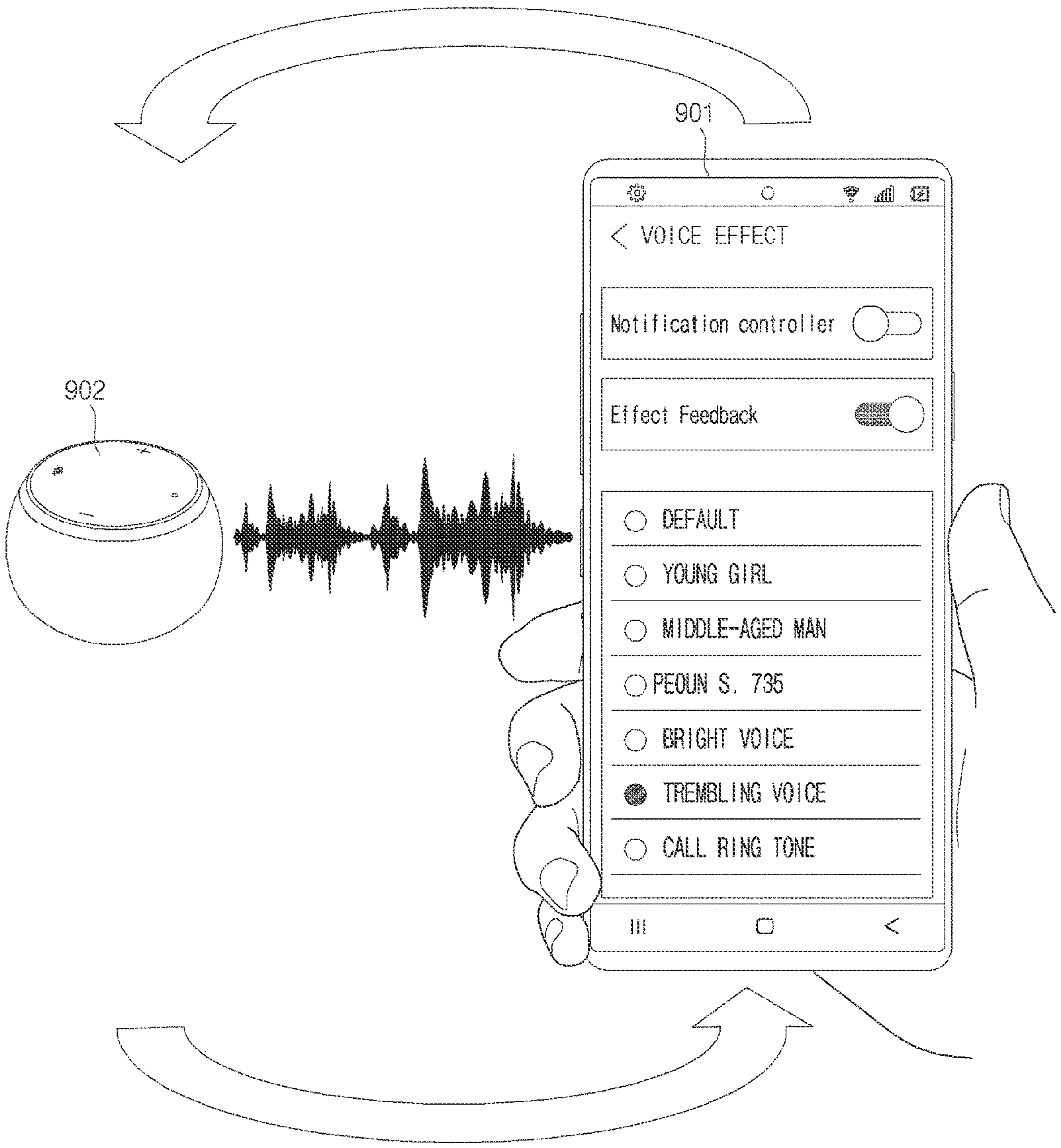
FIG. 9 illustrates an electronic device that communicates with an external device, according to an embodiment of the disclosure.

FIG. 9 illustrates an electronic device that communicates with an external device, according to an embodiment of the disclosure.

Referring to FIG. 9, according to an embodiment, an electronic device 901 may transmit and receive various data and/or signals with an external electronic device 902 by using a communication circuit (e.g., the communication module 190 of FIG. 1). For example, the external electronic device 902 may include various types of electronic devices (e.g., a mobile phone, a notebook PC, a desktop PC, or a Bluetooth speaker) capable of outputting an audio signal.

In an embodiment, the electronic device 901 may receive a user input for transmitting an audio signal to the external electronic device 902. For example, the electronic device 901 may be configured to transmit a modulated audio signal to predetermined external electronic devices or to external electronic devices selected by a user.

In an embodiment, the electronic device 901 may transmit a modulated audio signal to the external electronic device 902. For example, the electronic device 901 may transmit a modulated audio signal to the external electronic device 902. While the external electronic device 902 outputs a modulated audio signal, the electronic device 901 may turn off a microphone (e.g., the microphone 380 of FIG. 3). For example, the electronic device 901 may display, on a display (e.g., the display module 160 of FIG. 1), a user interface including information indicating that an audio signal modulated by the external electronic device 902 is being output.

Figure 10:
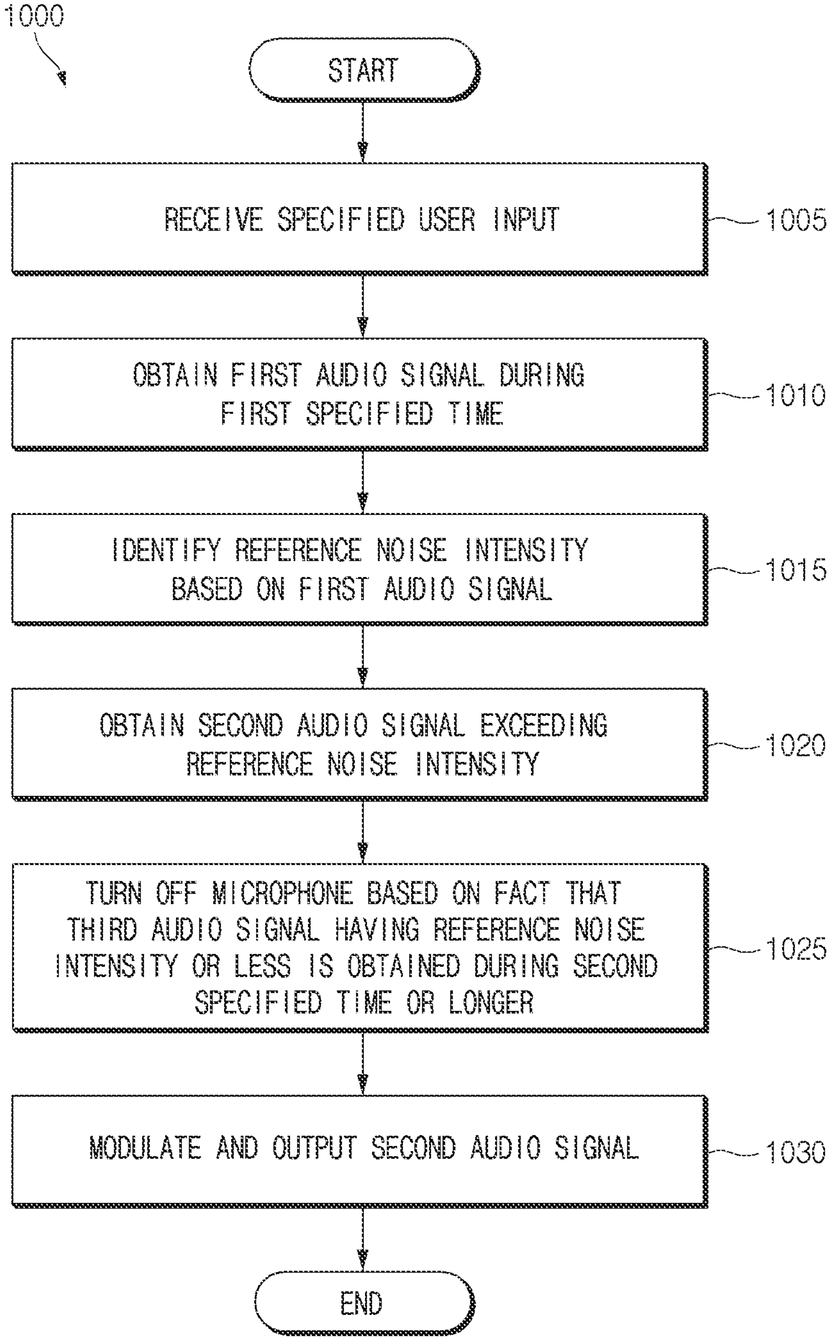
FIG. 10 is an operation flowchart of an electronic device, according to an embodiment of the disclosure.

FIG. 10 is an operation flowchart of an electronic device, according to an embodiment of the disclosure.

Referring to FIG. 10, according to an embodiment, an electronic device (e.g., the electronic device 101 of FIG. 1) may perform operations in a method 1000. For example, a processor of the electronic device (e.g., the processor 120 of FIG. 1) may be configured to perform operations of FIG. 10 when instructions stored in a memory (e.g., the memory 130 of FIG. 1) are executed.

In operation 1005, the electronic device may receive a specified user input. In an embodiment, the specified user input may be detected through a user interface. In an embodiment, the user interface may include an execution screen of an application (e.g., a voice modulation application). In an embodiment, a first user input may be a touch input to a noise recording button included in the execution screen of an application.

In operation 1010, the electronic device may obtain a first audio signal during a first specified time. In an embodiment, the electronic device may obtain the first audio signal based on the specified user input. In an embodiment, the electronic device may obtain the first audio signal in response to the first user input. In an embodiment, when the first user input is detected, the electronic device may obtain the first audio signal through a microphone (e.g., the microphone 380 of FIG. 3). In an embodiment, when the first user input is detected, the electronic device may obtain the first audio signal after turning on the microphone. For example, the first specified time may be 1 second. However, this is an example, and embodiments of the disclosure are not limited thereto.

In operation 1015, the electronic device may identify reference noise intensity based on the first audio signal. In an embodiment, the electronic device may identify the reference noise intensity based on an RMS value of the first audio signal. In an embodiment, the electronic device may identify the reference noise intensity based on the RMS value of the first audio signal and a specified weight. In an embodiment, the specified weight may be identified based on the first audio signal and at least one audio level. In an embodiment, at least one audio level may be obtained based on a user utterance input. For example, the electronic device may obtain a user utterance input by using a microphone and may identify an audio level based on the obtained user utterance input. For example, the electronic device may identify an audio level of a signal corresponding to a specified frequency band in the user utterance input. As another example, the electronic device may identify the audio level of the signal according to the specified frequency band in the user utterance input. For example, the specified frequency band may be referred to as a frequency band of a user's voice. For example, the specified frequency band may include a band of 500 to 8000 Hz. In an embodiment, the electronic device may identify whether an audio signal satisfies a specified condition. For example, the electronic device may identify whether an RMS value, the first audio signal, and/or a characteristic of at least one audio level satisfies the specified condition. In an embodiment, when it is identified that the RMS value, the first audio signal, and/or the characteristic of at least one audio level satisfies the specified condition, the electronic device may identify the reference noise intensity.

In operation 1020, the electronic device may obtain a second audio signal exceeding the reference noise intensity. In an embodiment, when a second user input is detected, the electronic device may turn on the microphone and then may obtain an audio signal. For example, the electronic device may detect the second user input to at least part of an execution screen of a specified application (e.g., a voice modulation application) displayed on the display. For example, the second user input may be a touch input to a voice recording button included in the execution screen of the application. In an embodiment, the processor 320 may obtain the second audio signal. For example, the signal intensity of the second audio signal may exceed the reference noise intensity. For example, when the second audio signal exceeding the reference noise intensity is obtained, the processor 320 may determine the obtained second audio signal as an audio signal to be modulated. An operation of determining an audio signal to be modulated based on reference noise intensity in operation 1020 is disclosed. However, embodiments of the disclosure are not limited thereto. According to another embodiment, the electronic device may determine an audio signal to be modulated, based on the characteristic of the obtained audio signal. The characteristic of the audio signal may include information included in the audio signal, a frequency band of the audio signal, the intensity of the audio signal, or a combination thereof. In an embodiment, the electronic device may obtain a fourth audio signal including a user utterance input and may determine the fourth audio signal as an audio signal to be modulated. For example, the electronic device may determine whether a signal of a frequency band corresponding to the user utterance input is included in the fourth audio signal. When it is identified that the fourth audio signal includes a signal of the frequency band corresponding to a user utterance input, the electronic device may determine that the fourth audio signal is an audio signal to be modulated, regardless of exceeding the reference noise intensity.

In operation 1025, the electronic device may turn off a microphone based on a fact that the third audio signal is obtained during a second specified time or longer. For example, the signal intensity of the third audio signal may not be greater than the reference noise intensity. For example, when an audio signal having the reference noise intensity or less is obtained during the second specified time or longer, the electronic device may determine that the user utterance input has terminated. For example, the second specified time may be 1 second. For example, when the third audio signal is obtained during the second specified time or longer, the electronic device may determine that the user utterance input has terminated, and then may turn off the microphone. For example, the third audio signal may be referred to as an audio signal that does not include a user utterance input. The electronic device may turn off the microphone and may determine the second audio signal as an audio signal to be modulated.

In operation 1030, the electronic device may modulate and output the second audio signal. In an embodiment, the electronic device may modulate an audio signal and may output the audio signal through a speaker (e.g., the speaker 370 of FIG. 3). For example, the electronic device may turn off the microphone and may output the modulated audio signal through the speaker 370. For example, the electronic device may modulate the second audio signal and may output the modulated second audio signal through the speaker. As another example, the electronic device may modulate the fourth audio signal and may output the modulated fourth audio signal through the speaker. It is described that the electronic device directly outputs a modulated audio signal in operation 1030. However, embodiments of the disclosure are not limited thereto. In another embodiment, the electronic device may transmit a modulated audio signal to an external device (e.g., a Bluetooth speaker) through a communication circuit (e.g., the communication circuit 390 of FIG. 3). For example, the electronic device may control an external device so as to transmit the modulated audio signal to the external device without being output and then to output the modulated audio signal. For example, while the modulated audio signal is output by the external device, the electronic device may continuously turn off the microphone. In an embodiment, when the output of the modulated audio signal is finished, the electronic device may turn on the microphone. For example, the electronic device may output a modulated audio signal. When the output of the modulated audio signal is terminated, the electronic device may turn on the microphone and may obtain various audio signals. For example, the electronic device may repeatedly determine whether a signal obtained by using the microphone exceeds previously-identified reference noise intensity.

Figure 11:
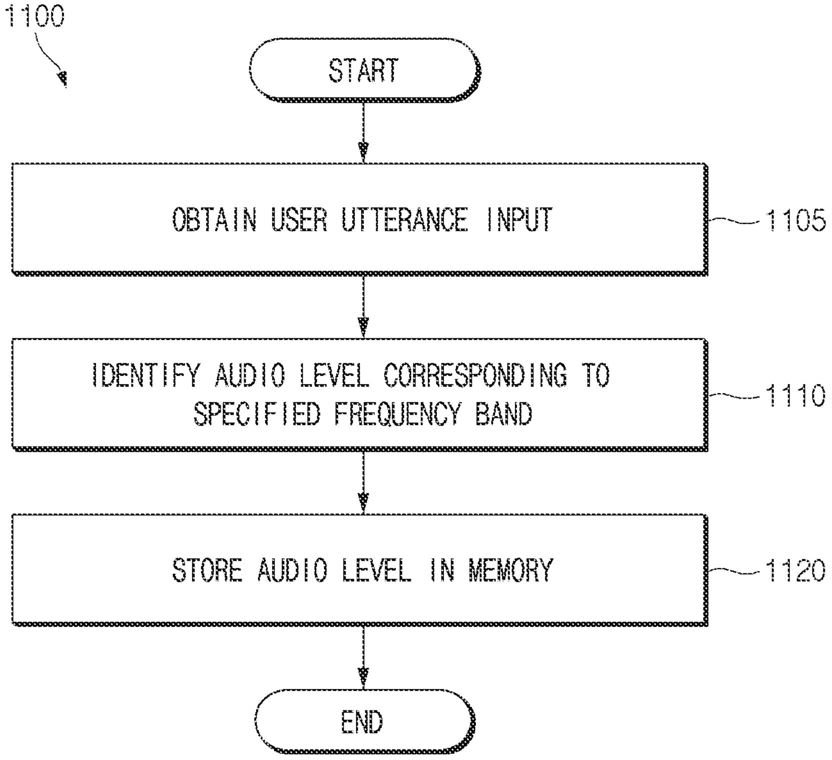
FIG. 11 is an operation flowchart of an electronic device, according to an embodiment of the disclosure.

FIG. 11 is an operation flowchart of an electronic device, according to an embodiment of the disclosure.

Referring to FIG. 11, according to an embodiment, an electronic device (e.g., the electronic device 101 of FIG. 1) may perform operations on a method 1100. For example, a processor of the electronic device (e.g., the processor 120 of FIG. 1) may be configured to perform operations of FIG. 11 when instructions stored in a memory (e.g., the memory 130 of FIG. 1) are executed.

In operation 1105, the electronic device may obtain a user utterance input. In an embodiment, the electronic device may obtain a user utterance input by using a microphone (e.g., the microphone 380 of FIG. 3) based on a specified user input.

In operation 1110, the electronic device may identify an audio level corresponding to a specified frequency band. In an embodiment, the electronic device may identify at least one audio level corresponding to the specified frequency band based on the obtained user utterance input. In an embodiment, at least one audio level may be obtained based on a user utterance input. For example, the electronic device may obtain a user utterance input by using a microphone and may identify an audio level based on the obtained user utterance input. For example, the electronic device may identify an audio level of a signal corresponding to a specified frequency band in the user utterance input. For example, the electronic device may identify an audio level of a signal according to a specified frequency band in the user utterance input. For example, the specified frequency band may be referred to as a frequency band of a user's voice. For example, the specified frequency band may include a band of 500 to 8000 Hz.

In operation 1120, the electronic device may store the identified at least one audio level in a memory (e.g., the memory 330 of FIG. 3). In an embodiment, the electronic device may use the stored at least one level for identification of reference noise intensity. For example, when identifying the reference noise intensity, the electronic device may use at least one level stored in a memory.

Figure 12:
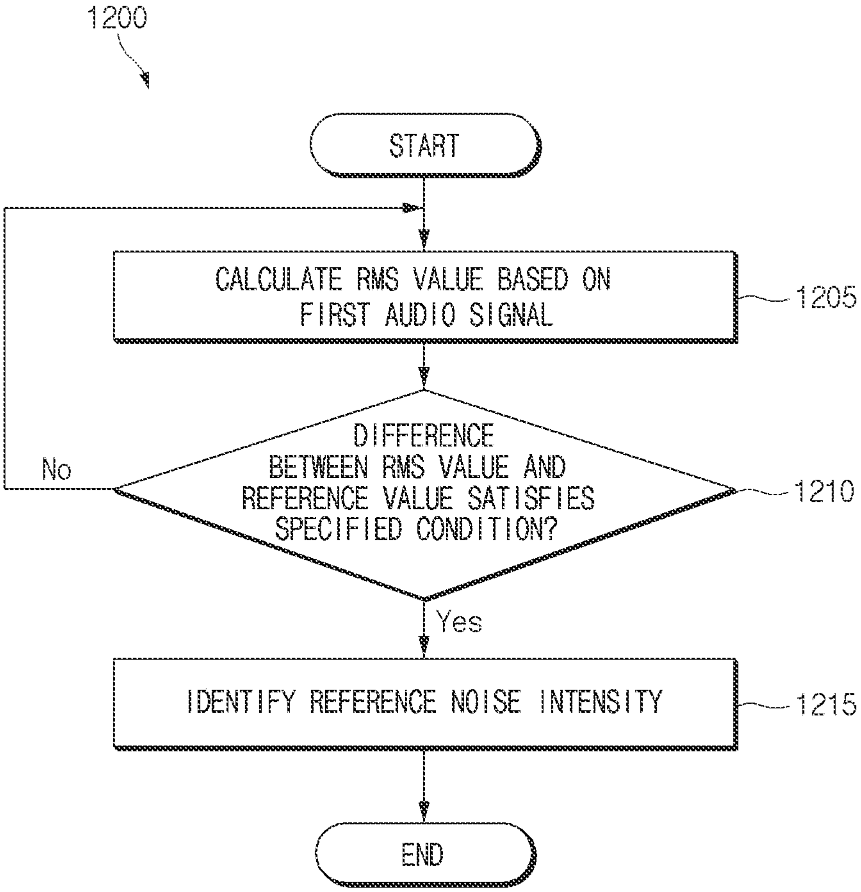
FIG. 12 is an operating flowchart of an electronic device, according to an embodiment of the disclosure.

FIG. 12 is an operation flowchart of an electronic device, according to an embodiment of the disclosure.

Referring to FIG. 12, according to an embodiment, an electronic device (e.g., the electronic device 101 of FIG. 1) may perform operations in a method 1200. For example, a processor of the electronic device (e.g., the processor 120 of FIG. 1) may be configured to perform operations of FIG. 12 when instructions stored in a memory (e.g., the memory 130 of FIG. 1) are executed.

In operation 1205, the electronic device may calculate an RMS value (e.g., the RMS value 510 of FIG. 5) based on the first audio signal. In an embodiment, the RMS value may be referred to as an average value of an audio level of the first audio signal. For example, the electronic device may convert the first audio signal based on a pulse code modulation (PCM) method. The electronic device may identify a value, which is obtained by squaring sampled data values, adding all of the squared data values to generate a total data value, and dividing the total data value by the total number of samples, as the RMS value.

In operation 1210, the electronic device may determine whether a difference between the RMS value and a reference value (e.g., the reference value 520 of FIG. 5) satisfies a specified condition. For example, when the difference between the RMS value and the reference value satisfies the specified condition (e.g., operation 1210—Yes), the electronic device may perform operation 1215. For example, when the difference between the RMS value and the reference value does not satisfy the specified condition (e.g., operation 1210—No), the electronic device may repeatedly perform operation 1205. In an embodiment, the reference value may be referred to as the average intensity of ambient noise. For example, the reference value may be 40 to 60 dB. However, this is an example, and embodiments of the disclosure are not limited thereto. For example, the electronic device may identify the reference value determined by a user's setting. As another example, the electronic device may identify the reference value preset in the specified application. In an embodiment, the electronic device may compare a value of the RMS with the reference value. For example, when the difference between the RMS value and the reference value is less than a first value calculated based on the reference value, the electronic device may identify the reference noise intensity. For example, the first value may be referred to as a value corresponding to 0.7 times the reference value. However, this is an example, and embodiments of the disclosure are not limited thereto.

In operation 1215, the electronic device may identify the reference noise intensity. For example, the electronic device may identify the reference noise intensity by using the value of the RMS, at least one audio level calculated based on the first audio signal, and at least one audio level calculated based on a user utterance input.

Figure 13:
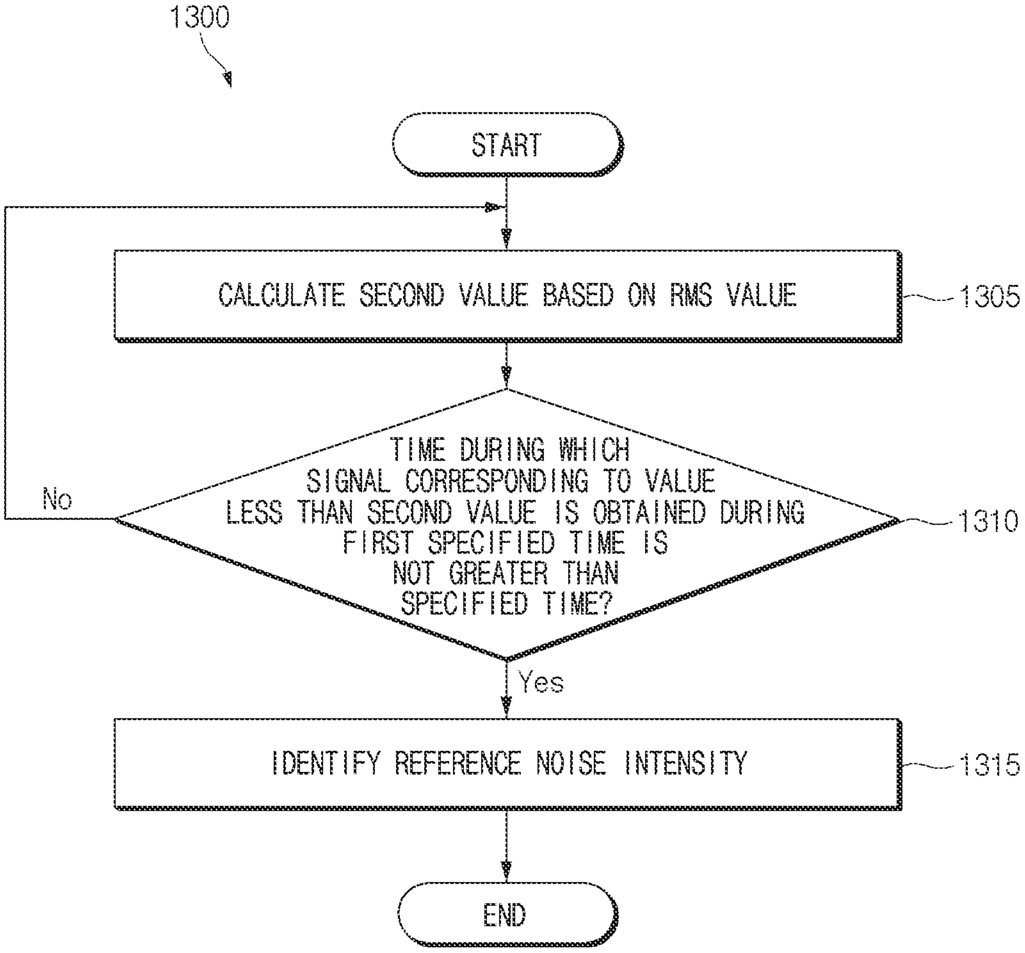
FIG. 13 is an operation flowchart of an electronic device, according to an embodiment of the disclosure.

FIG. 13 is an operation flowchart of an electronic device, according to an embodiment of the disclosure.

Referring to FIG. 13, according to an embodiment, an electronic device (e.g., the electronic device 101 of FIG. 1) may perform operations in a method 1300. For example, a processor of the electronic device (e.g., the processor 120 of FIG. 1) may be configured to perform operations of FIG. 13 when instructions stored in a memory (e.g., the memory 130 of FIG. 1) are executed.

In operation 1305, the electronic device may calculate a second value based on an RMS value. In an embodiment, when a time during which a signal corresponding to a value less than a second value calculated based on the RMS value is obtained during the first specified time is not greater than the specified time, the electronic device may identify the reference noise intensity by using the value of the RMS, at least one audio level calculated based on the first audio signal, and at least one audio level calculated based on a user utterance input. For example, the second value may be referred to as a value corresponding to 1.3 times the RMS value. However, this is an example, and embodiments of the disclosure are not limited thereto.

In operation 1310, the electronic device may determine whether a time during which a signal corresponding to a value less than a second value is obtained during the first specified time is not greater than a specified time. For example, when the time during which the signal corresponding to a value less than the second value is obtained during the first specified time is not greater than the specified time (e.g., operation 1310—Yes), the electronic device may perform operation 1315. For example, when the time during which the signal corresponding to a value less than the second value is obtained during the first specified time is greater than the specified time (e.g., operation 1310—No), the electronic device may repeatedly perform operation 1305.

In operation 1315, the electronic device may identify the reference noise intensity. In an embodiment, when the first specified time satisfies a specified criterion, the electronic device may identify the reference noise intensity. For example, when a time during which a signal corresponding to a value less than the second value is obtained during the first specified time is not greater than the specified time, the electronic device may identify the reference noise intensity. For example, the specified time may be referred to as a time corresponding to 10% of the first specified time. However, this is an example, and embodiments of the disclosure are not limited thereto.

Figure 14:
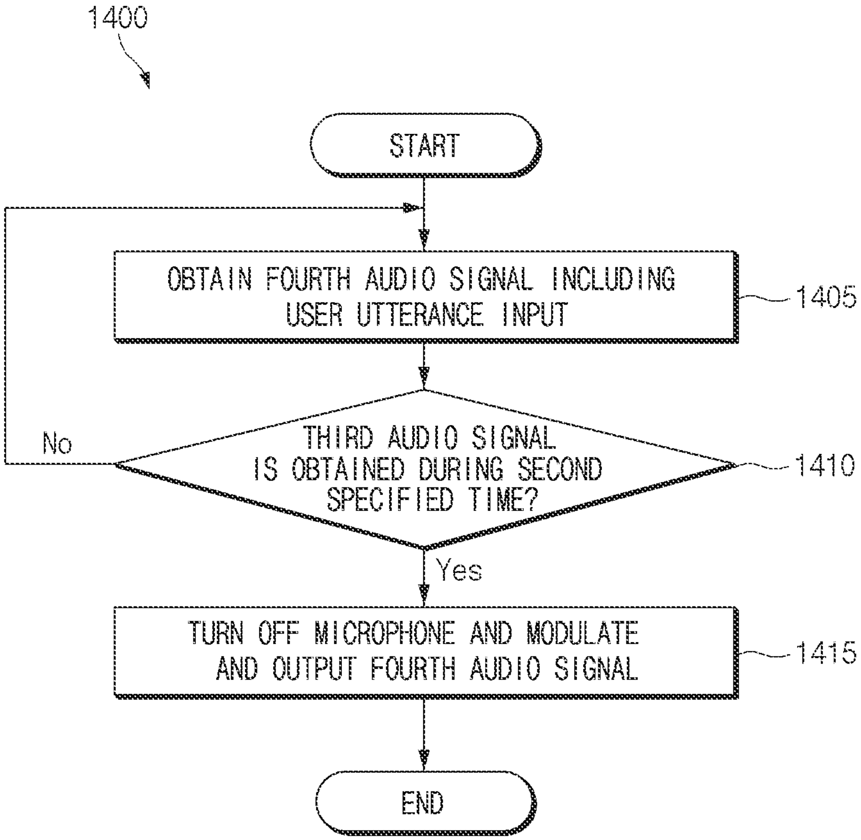
FIG. 14 is an operating flowchart of an electronic device, according to an embodiment of the disclosure.

FIG. 14 is an operation flowchart of an electronic device, according to an embodiment of the disclosure.

Referring to FIG. 14, according to an embodiment, an electronic device (e.g., the electronic device 101 of FIG. 1) may perform operations of a method 1300. For example, a processor of the electronic device (e.g., the processor 120 of FIG. 1) may be configured to perform operations of FIG. 14 when instructions stored in a memory (e.g., the memory 130 of FIG. 1) are executed.

In operation 1405, the electronic device may obtain a fourth audio signal including a user utterance input. In an embodiment, the electronic device may determine an audio signal to be modulated, based on the characteristic of the obtained audio signal. The characteristic of the audio signal may include information included in the audio signal, a frequency band of the audio signal, the intensity of the audio signal, or a combination thereof. In an embodiment, the electronic device may obtain the fourth audio signal including the user utterance input and may determine the fourth audio signal as an audio signal to be modulated. For example, the electronic device may determine whether a signal of a frequency band corresponding to the user utterance input is included in the fourth audio signal. When it is identified that the fourth audio signal includes a signal of the frequency band corresponding to a user utterance input, the electronic device may determine that the fourth audio signal is an audio signal to be modulated, regardless of exceeding the reference noise intensity.

In operation 1410, the electronic device may determine whether the third audio signal is obtained during a second specified time or longer. For example, when the third audio signal is obtained during the second specified time (e.g., operation 1410—Yes), the electronic device may perform operation 1415. For example, when the third audio signal is not obtained during the second specified time (e.g., operation 1410—No), the electronic device may repeat operation 1405.

In operation 1415, the electronic device may turn off the microphone and may modulate and output the fourth audio signal. In an embodiment, the signal intensity of the third audio signal may not be greater than the reference noise intensity. For example, when an audio signal having the reference noise intensity or less is obtained during the second specified time or longer, the electronic device may determine that the user utterance input has terminated. For example, the second specified time may be 1 second. For example, when the third audio signal is obtained during the second specified time or longer, the electronic device may determine that the user utterance input has terminated, and then may turn off the microphone. For example, the third audio signal may be referred to as an audio signal that does not include a user utterance input. The electronic device may turn off the microphone, may modulate the fourth audio signal, and may output the fourth audio signal to the outside by using a speaker (e.g., the speaker 370 of FIG. 3). It is described that the electronic device directly outputs a modulated audio signal in operation 1415. However, embodiments of the disclosure are not limited thereto. In another embodiment, the electronic device may transmit a modulated audio signal to an external device (e.g., a Bluetooth speaker) through a communication circuit (e.g., the communication circuit 390 of FIG. 3). For example, the electronic device may control an external device so as to transmit the modulated audio signal to the external device without being output and then to output the modulated audio signal. For example, while the modulated audio signal is output by the external device, the electronic device may continuously turn off the microphone. In an embodiment, when the output of the modulated audio signal is finished, the electronic device may turn on the microphone. For example, the electronic device may output a modulated audio signal. When the output of the modulated audio signal is terminated, the electronic device may turn on the microphone and may obtain various audio signals. For example, the electronic device may repeatedly determine whether a signal obtained by using the microphone exceeds previously-identified reference noise intensity.

According to an embodiment of the disclosure, an electronic device may include a speaker, a microphone, a processor, and a memory operatively connected to the speaker, the microphone, and the processor and configured to store instructions.

According to an embodiment, the instructions may, when executed by the processor, cause the electronic device to obtain a first audio signal during a first specified time by using the microphone, to identify reference noise intensity based on the first audio signal, to obtain a second audio signal exceeding the reference noise intensity by using the microphone, to turn off the microphone based on a fact that a third audio signal having the reference noise intensity or less is obtained during a second specified time or longer, and to modulate and output the second audio signal through the speaker while the microphone is turned off.

According to an embodiment, when executed by the processor, the instructions may cause the electronic device to obtain a user utterance input by using the microphone, to identify at least one audio level corresponding to a specified frequency band based on the user utterance input, and to store the identified at least one audio level in the memory.

According to an embodiment, when executed by the processor, the instructions may cause the electronic device to calculate a root mean square (RMS) value based on the first audio signal obtained during the first specified time and to identify the reference noise intensity by using the RMS value, the first audio signal, and the at least one audio level.

According to an embodiment, when executed by the processor, the instructions may cause the electronic device to identify the reference noise intensity by using the RMS value, the first audio signal, and the at least one audio level when a difference between the RMS value and a reference value is less than a first value calculated based on the reference value.

According to an embodiment, when executed by the processor, the instructions may cause the electronic device to identify the reference noise intensity by using the RMS value, the first audio signal, and the at least one audio level when a time, during which a signal corresponding to a value less than a second value calculated based on the RMS value is obtained during the first specified time is not greater than a specified time.

According to an embodiment, when executed by the processor, the instructions may cause the electronic device to identify the reference noise intensity by using a signal corresponding to the specified frequency band in the first audio signal.

According to an embodiment, when executed by the processor, the instructions may cause the electronic device to obtain a fourth audio signal including a user utterance input by using the microphone, to turn off the microphone based on a fact that the third audio signal is obtained during the second specified time or longer, and to modulate and output the fourth audio signal through the speaker while the microphone is turned off.

According to an embodiment, when executed by the processor, the instructions may cause the electronic device to turn on the microphone when the output of the modulated second audio signal is terminated and to determine whether a signal obtained by using the microphone exceeds the reference noise intensity.

According to an embodiment, the electronic device may further include a communication circuit. When executed by the processor, the instructions may cause the electronic device to modulate the second audio signal while the microphone is turn off, and to transmit the modulated second audio signal to an external device through the communication circuit.

According to an embodiment, the electronic device may further include a display. When executed by the processor, the instructions may cause the electronic device to display a user interface including information about whether to operate the microphone, on the display while outputting the modulated second audio signal.

According to an embodiment of the disclosure, a method in which an electronic device processes an audio signal may include obtaining a first audio signal during a first specified time by using a microphone, identifying reference noise intensity based on the first audio signal, obtaining a second audio signal exceeding the reference noise intensity by using the microphone, turning off the microphone based on a fact that a third audio signal having the reference noise intensity or less is obtained during a second specified time or longer, and while the microphone is turned off, modulating and outputting the second audio signal through a speaker.

According to an embodiment, the identifying of the reference noise intensity based on the first audio signal may include obtaining a user utterance input by using the microphone, identifying at least one audio level corresponding to a specified frequency band based on the user utterance input, and storing the identified at least one audio level in the memory.

According to an embodiment, the identifying of the reference noise intensity based on the first audio signal may include calculating an RMS value based on the first audio signal obtained during the first specified time and identifying the reference noise intensity by using the RMS value, the first audio signal, and the at least one audio level.

According to an embodiment, the identifying of the reference noise intensity based on the first audio signal may include identifying the reference noise intensity by using the RMS value, the first audio signal, and the at least one audio level when a difference between the RMS value and a reference value is less than a first value calculated based on the reference value.

According to an embodiment, the identifying of the reference noise intensity based on the first audio signal may include identifying the reference noise intensity by using the RMS value, the first audio signal, and the at least one audio level when a time during which a signal corresponding to a value less than a second value calculated based on the RMS value is obtained, during the first specified time is not greater than a specified time.

According to an embodiment, the identifying of the reference noise intensity based on the first audio signal may include identifying the reference noise intensity by using a signal corresponding to the specified frequency band in the first audio signal.

According to an embodiment, the method in which the electronic device processes the audio signal may further include obtaining a fourth audio signal including a user utterance input by using the microphone, turning off the microphone based on a fact that the third audio signal is obtained during the second specified time or longer, and modulating and outputting the fourth audio signal through the speaker while the microphone is turned off.

According to an embodiment, the method in which the electronic device processes the audio signal may further include turning on the microphone when the output of the modulated second audio signal is terminated and determining whether a signal obtained by using the microphone exceeds the reference noise intensity.

According to an embodiment, the modulating and outputting of the second audio signal through the speaker while the microphone is turned off may further include transmitting the modulated second audio signal to an external device through a communication circuit.

According to an embodiment, the modulating and outputting of the second audio signal through the speaker while the microphone is turned off may include displaying a user interface including information about whether to operate the microphone, on the display while outputting the modulated second audio signal.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:

a speaker;

a microphone;

a processor; and a memory operatively connected to the speaker, the microphone, and the processor and configured to store instructions, wherein the instructions, when executed by the processor, cause the electronic device to:

obtain a first audio signal during a first specified time by using the microphone, identify reference noise intensity based on the first audio signal, obtain a second audio signal exceeding the reference noise intensity by using the microphone, turn off the microphone based on a fact that a third audio signal having the reference noise intensity or less is obtained during a second specified time or longer, and while the microphone is turned off, modulate and output the second audio signal through the speaker.

2. The electronic device of claim 1, wherein the instructions, when executed by the processor, further cause the electronic device to:

obtain a user utterance input by using the microphone, identify at least one audio level corresponding to a specified frequency band based on the user utterance input, and store the identified at least one audio level in the memory.

3. The electronic device of claim 2, wherein the instructions, when executed by the processor, further cause the electronic device to:

calculate a root mean square (RMS) value based on the first audio signal obtained during the first specified time, and identify the reference noise intensity by using the RMS value, the first audio signal, and the at least one audio level.

4. The electronic device of claim 3, wherein the instructions, when executed by the processor, further cause the electronic device to:

when a difference between the RMS value and a reference value is less than a first value calculated based on the reference value, identify the reference noise intensity by using the RMS value, the first audio signal, and the at least one audio level.

5. The electronic device of claim 3, wherein the instructions, when executed by the processor, further cause the electronic device to:

when a time, during which a signal corresponding to a value less than a second value calculated based on the RMS value is obtained during the first specified time is not greater than a specified time, identify the reference noise intensity by using the RMS value, the first audio signal, and the at least one audio level.

6. The electronic device of claim 3, wherein the instructions, when executed by the processor, further cause the electronic device to:

identify the reference noise intensity by using a signal corresponding to the specified frequency band in the first audio signal.

7. The electronic device of claim 1, wherein the instructions, when executed by the processor, further cause the electronic device to:

obtain a fourth audio signal including a user utterance input by using the microphone, turn off the microphone based on a fact that the third audio signal is obtained during the second specified time or longer, and while the microphone is turned off, modulate and output the fourth audio signal through the speaker.

8. The electronic device of claim 1, wherein the instructions, when executed by the processor, further cause the electronic device to:

when the output of the modulated second audio signal is terminated, turn on the microphone, and determine whether a signal obtained by using the microphone exceeds the reference noise intensity.

9. The electronic device of claim 1, further comprising:

a communication circuit, wherein the instructions, when executed by the processor, further cause the electronic device to:

while the microphone is turned off, modulate the second audio signal, and transmit the modulated second audio signal to an external device through the communication circuit.

10. The electronic device of claim 1, further comprising:

a display, wherein the instructions, when executed by the processor, further cause the electronic device to:

while outputting the modulated second audio signal, display a user interface including information about whether to operate the microphone, on the display.

11. A method in which an electronic device processes an audio signal, the method comprising:

obtaining a first audio signal during a first specified time by using a microphone;

identifying reference noise intensity based on the first audio signal;

obtaining a second audio signal exceeding the reference noise intensity by using the microphone;

turning off the microphone based on a fact that a third audio signal having the reference noise intensity or less is obtained during a second specified time or longer; and while the microphone is turned off, modulating and outputting the second audio signal through a speaker.

12. The method of claim 11, wherein the identifying of the reference noise intensity based on the first audio signal comprises:

obtaining a user utterance input by using the microphone;

identifying at least one audio level corresponding to a specified frequency band based on the user utterance input; and storing the identified at least one audio level in a memory.

13. The method of claim 12, wherein the identifying of the reference noise intensity based on the first audio signal comprises:

calculating a root mean square (RMS) value based on the first audio signal obtained during the first specified time; and identifying the reference noise intensity by using the RMS value, the first audio signal, and the at least one audio level.

14. The method of claim 13, wherein the identifying of the reference noise intensity based on the first audio signal comprises:

when a difference between the RMS value and a reference value is less than a first value calculated based on the reference value, identifying the reference noise intensity by using the RMS value, the first audio signal, and the at least one audio level.

15. The method of claim 13, wherein the identifying of the reference noise intensity based on the first audio signal comprises:

when a time during which a signal corresponding to a value less than a second value calculated based on the RMS value is obtained, during the first specified time is not greater than a specified time, identifying the reference noise intensity by using the RMS value, the first audio signal, and the at least one audio level.

* * * * *